United States Patent
Fogg et al.

(10) Patent No.: US 12,325,388 B2
(45) Date of Patent: Jun. 10, 2025

(54) TRAILER JACK

(71) Applicant: Tractor Supply Co. of Texas, LP, Brentwood, TN (US)

(72) Inventors: Christian Fogg, Columbia, TN (US); Ty Rager, Brentwood, TN (US); Nick Ni, Jinjua (CN)

(73) Assignee: Tractor Supply Company, Brentwood, TN (US)

( * ) Notice: Subject to any disclaimer, the term of this patent is extended or adjusted under 35 U.S.C. 154(b) by 428 days.

(21) Appl. No.: 18/056,292

(22) Filed: Nov. 17, 2022

(65) Prior Publication Data

US 2024/0166170 A1     May 23, 2024

(51) Int. Cl.
| | |
|---|---|
| *B60D 1/66* | (2006.01) |
| *B60S 9/00* | (2006.01) |
| *B60S 9/02* | (2006.01) |
| *B60S 9/06* | (2006.01) |
| *B60S 9/08* | (2006.01) |

(Continued)

(52) U.S. Cl.
CPC .................. *B60S 9/06* (2013.01); *B60D 1/66* (2013.01); *E04H 12/2261* (2013.01); *B60S 9/08* (2013.01); *B60S 9/22* (2013.01); *E04H 12/2284* (2013.01)

(58) Field of Classification Search
CPC .. B60D 1/66; B60D 1/187; B60D 1/58; B60S 9/22; B60S 9/08; B60S 9/02; B60S 9/04; B60S 9/06; B60S 9/18; B66F 3/08
USPC .......... 254/420, 424, 100; D34/31; 280/475, 280/477, 763.1; 248/221.12, 223.21, 519
See application file for complete search history.

(56) References Cited

U.S. PATENT DOCUMENTS

| | | | | |
|---|---|---|---|---|
| 2,746,780 A | * | 5/1956 | Comino | A63H 33/12 |
| | | | | 52/690 |
| 4,035,093 A | * | 7/1977 | Redshaw | F16B 5/0225 |
| | | | | 403/4 |

(Continued)

FOREIGN PATENT DOCUMENTS

| | | | |
|---|---|---|---|
| AU | 2021204066 A1 * | 1/2022 | |
| DE | 202020003342 U1 * | 10/2020 | |
| WO | WO-2007048677 A1 * | 5/2007 | ............ B60S 1/0444 |

OTHER PUBLICATIONS

Suspension Pro Electric Tongue Jack Found at: https://www.rvupgradestore.com/Suspension-Pro-2500-lbs-Electric-Tongue-Jack-p/15-1464.htm (Year: 2025).*

(Continued)

*Primary Examiner* — Mahdi H Nejad
(74) *Attorney, Agent, or Firm* — Lucian Wayne Beavers; Patterson Intellectual Property Law PC

(57) ABSTRACT

A trailer jack comprising a vertically oriented vertically extendible jack and a mounting flange located on the jack. The mounting flange includes three bolt patterns. Each of the three bolt patterns includes a forward slot and two rear slots defined through the mounting flange. Each slot includes a longitudinal axis. The longitudinal axes of the slots of any single bolt pattern intersect at a bolt pattern axis that is closer to the forward slot than the rear slots. The longitudinal axes of the forward slots intersect at a central axis. The central axis is offset from each of the three bolt pattern axes. The rear slots of any of the bolt patterns are non-radial with regard to the central axis. The forward slot of any of the bolt patterns are radial with regard to the central axis.

19 Claims, 9 Drawing Sheets

(51) Int. Cl.
*E04H 12/22* (2006.01)
*B60S 9/22* (2006.01)

(56) References Cited

U.S. PATENT DOCUMENTS

| | | | | |
|---|---|---|---|---|
| 5,174,550 | A * | 12/1992 | Pittman | B66F 3/08 |
| | | | | 254/420 |
| 5,560,630 | A | 10/1996 | Phares et al. | |
| 5,857,693 | A | 1/1999 | Clark | |
| 7,216,851 | B1 * | 5/2007 | Green | B60S 9/22 |
| | | | | 254/420 |
| 7,584,677 | B1 * | 9/2009 | Johnson | B60S 9/08 |
| | | | | 254/424 |
| 8,246,011 | B1 * | 8/2012 | Fox, III | B60D 1/66 |
| | | | | 254/420 |
| 8,348,241 | B2 | 1/2013 | Trowbridge et al. | |
| 8,568,055 | B2 * | 10/2013 | Marques Lito Velez Grilo | E02D 27/42 |
| | | | | 403/4 |
| 10,099,524 | B1 | 10/2018 | Landry | |
| 10,252,591 | B1 * | 4/2019 | Searer | B66F 3/08 |
| 10,422,150 | B2 * | 9/2019 | Roy | E02D 27/42 |
| 10,532,895 | B1 | 1/2020 | Best | |
| D904,939 | S | 12/2020 | Karlsson | |
| 10,954,082 | B2 | 3/2021 | Best et al. | |
| 11,318,917 | B2 | 5/2022 | Xiang | |
| 2003/0122347 | A1 * | 7/2003 | Walters | B60D 1/66 |
| | | | | 280/475 |
| 2005/0285011 | A1 * | 12/2005 | Harwood | E04H 12/2261 |
| | | | | 248/519 |
| 2008/0184633 | A1 * | 8/2008 | Hamilton | E02D 27/42 |
| | | | | 52/127.12 |
| 2010/0213427 | A1 * | 8/2010 | Trowbridge | B60D 1/06 |
| | | | | 254/420 |
| 2011/0290971 | A1 * | 12/2011 | Molter | F16M 13/02 |
| | | | | 248/276.1 |
| 2018/0229696 | A1 | 8/2018 | Chen et al. | |
| 2018/0251996 | A1 * | 9/2018 | Roy | E04H 12/2284 |
| 2018/0312143 | A1 * | 11/2018 | Evans | B66F 3/08 |
| 2024/0140156 | A1 * | 5/2024 | Jelinek | B60D 1/247 |

OTHER PUBLICATIONS

Tractor Supply Carry-On Trailer A-frame Jack Install on Home Depot Karavan Trailer (3 bolt triangular pattern) Found at: https://www.youtube.com/watch?v=crRzFSKFGgU (Year: 2022).*

World's Fastest Electric Tongue Jack! [ UltraFab Phoenix 4000 ] Found at: https://www.youtube.com/watch?v=DNhOJrtj4TY (Year: 2023).*

Trailer Valet JXC Trailer Jack; etrailer.com website captured Dec. 13, 2022; https://www.etrailer.com/Trailer-Jack/Trauker-Valet/TV94FR.html.

Info on Bolt Patterns: etrailer.com website captured Dec. 13, 2022; https://www.etrailer.com/question-75829.html.

Info on Bolt Patterns: etrailer.com website captured Dec. 13, 2022; https://www.etrailer.com/question-222044.html.

* cited by examiner

TRAILER JACK

This is a Nonprovisional patent application filed by Tractor Supply Company for the invention of a "TRAILER JACK."

FIELD OF THE DISCLOSURE

The present disclosure relates to trailer jacks of the type being vertically oriented and vertically extendible.

BACKGROUND

Trailer jacks of this type may for example include manual jacks, electric jacks, drill-powered jacks, hydraulic jacks, and others. These trailer jacks may have a mounting flange for attaching the jack to the tongue of a trailer. Attachment patterns on trailers often differ in size and arrangement. The alignment of the trailer jack's drive head in regard to the trailer is often predetermined based on the mounting flange having a single bolt pattern.

Accordingly, there is a continuing need for improved trailer jacks that are both capable of alignment with multiple trailer attachment patterns and capable of selectively positioning the direction of the drive head.

SUMMARY OF THE DISCLOSURE

The current disclosure provides improvements in trailer jacks for alignment with multiple trailer attachment patterns and selectively positioning the direction of the drive head.

In one embodiment a trailer jack comprises a vertically oriented vertically extendible jack and a mounting flange located on the jack. The mounting flange includes three bolt patterns. Each of the three bolt patterns includes a forward slot and two rear slots defined through the mounting flange. Each slot includes a longitudinal axis. The longitudinal axes of the slots of any single bolt pattern intersect at a bolt pattern axis that is closer to the forward slot than the rear slots. The longitudinal axes of the forward slots intersect at a central axis. The central axis is offset from each of the three bolt pattern axes. The rear slots of any of the bolt patterns are non-radial with regard to the central axis. The forward slot of any of the bolt patterns is radial with regard to the central axis.

In another embodiment a trailer jack comprises a vertically oriented vertically extendible jack and a circular mounting flange located on the jack. The mounting flange includes a central axis and nine slots defined through the mounting flange. Each slot includes a longitudinal axis. Three of the slots are radial with regard to the central axis. Six of the slots are non-radial with regard to the central axis. The longitudinal axes of a first and second non-radial slot intersect at a first offset axis that is offset from the central axis. The longitudinal axes of a third and fourth non-radial slot intersect at a second offset axis that is offset from the central axis. The longitudinal axes of a fifth and sixth non-radial slot intersect at a third offset axis that is offset from the central axis. The first, second, and third offset axes are offset from each other.

DETAILED DESCRIPTION

Figure 1:
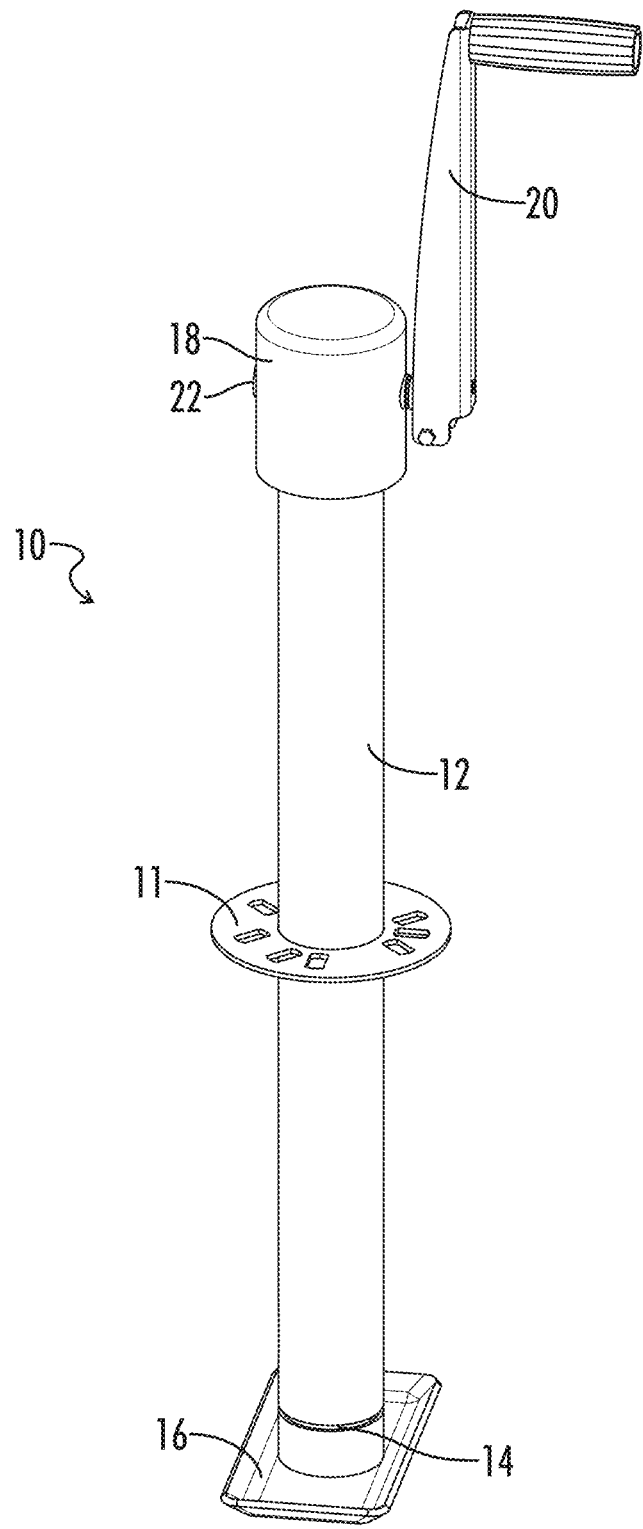
FIG. 1 is a perspective view of a vertically oriented vertically extendable trailer jack in an extended position.

Referring now to the drawings and particularly to FIG. 1, a trailer jack, namely a vertically oriented vertically extendible jack, is shown and generally designated by the number 10. Note, while FIG. 1 shows a manual jack with drill power option, the device disclosed herein is applicable to manual jacks, electric jacks, drill-powered jacks, hydraulic jacks, and other trailer jacks of the type that are vertically oriented and vertically extendible.

The trailer jack 10 includes a mounting flange 11, an outer tube 12, an inner tube 14, a foot 16, a gear housing 18, a hand crank 20, and a gear shaft 22. The foot 16 is connected to a bottom of the inner tube 14. The inner tube 14 is telescopically slidable within the outer tube 12. The gear housing 18 is located on a top of the outer tube 12. The gear shaft 22 passes through the gear housing 18 and is connected to the hand crank 20. A user can manually rotate the hand crank 20 to lift the trailer jack 10 via the gear shaft 22. The trailer jack 10 in FIG. 1 is in an extended position.

Figure 2:
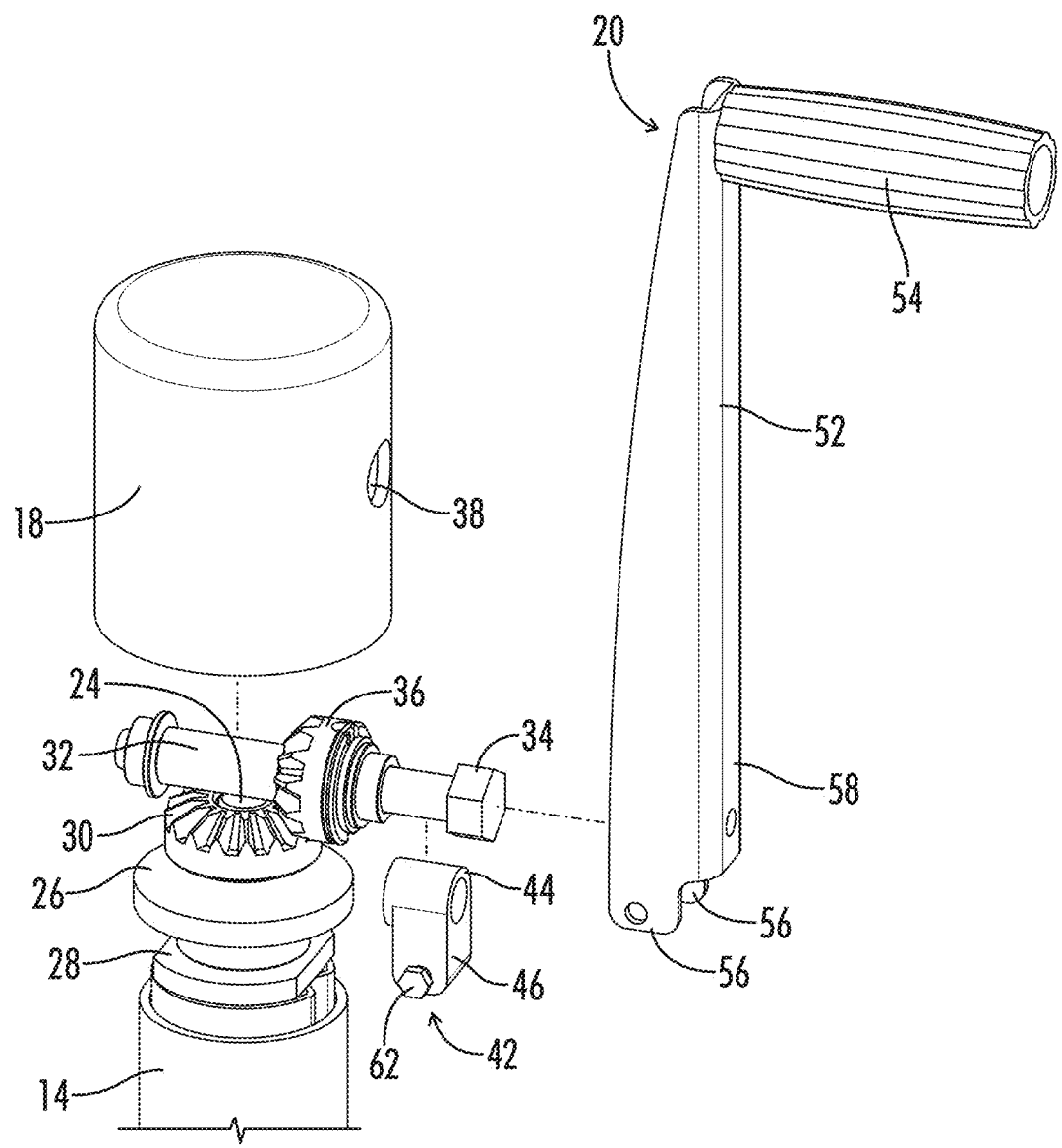
FIG. 2 is an exploded partial view of the trailer jack of FIG. 1.

FIG. 2 is a partial view of the trailer jack 10 without the gear housing 18 and the hand crank 20 attached. The trailer jack 10 includes a threaded rod 24 and a top block 26. The threaded rod 24 passes through a center of the top block 26 and is rotatably held within the outer tube 12 and fixed from axial movement relative to the outer tube 12. The trailer jack 10 also includes a threaded block 28 connected to a top of the inner tube 14. The threaded block 28 has threads that engage the threaded rod 24 so that the rotation of the threaded rod 24 causes the inner tube 14 to slide axially within the outer tube 12.

The trailer jack 10 also includes a driving gear 30 that is securely connected to the top block 26 and the threaded rod 24. When the driving gear 30 rotates, it simultaneously moves the top block 26 and the threaded rod 24. The threaded rod 24 in turn causes the inner tube 14 to slide axially within the outer tube 12. Thus, the trailer jack 10 can be lifted or lowered to a desired position.

The trailer jack 10 also includes a gear shaft 32. The gear shaft 32 is located on the top of the top block 26 and the driving gear 30. The gear shaft 32 includes a hexagonal head 34 at one end thereof. The gear shaft 32 also includes a bevel gear 36 located at a position that is about one third of a length of the gear shaft 32 from the hexagonal head 34. The bevel gear 36 engages the driving gear 30 so that the rotation of the bevel gear 36 rotates the driving gear 30. A gear ratio between the bevel gear 36 and the driving gear 30 is between 1:1 and 1:5. Preferably, the gear ratio between the bevel gear 36 and the driving gear 30 is 1.25.

The gear housing 18 covers the top block 26, the driving gear 30, and the gear shaft 22, and prevents them from being damaged during operation. The gear housing 18 has a cup shape and includes two through holes 38. The gear shaft 32 passes through the through holes 38 and rotates freely.

Figure 3:
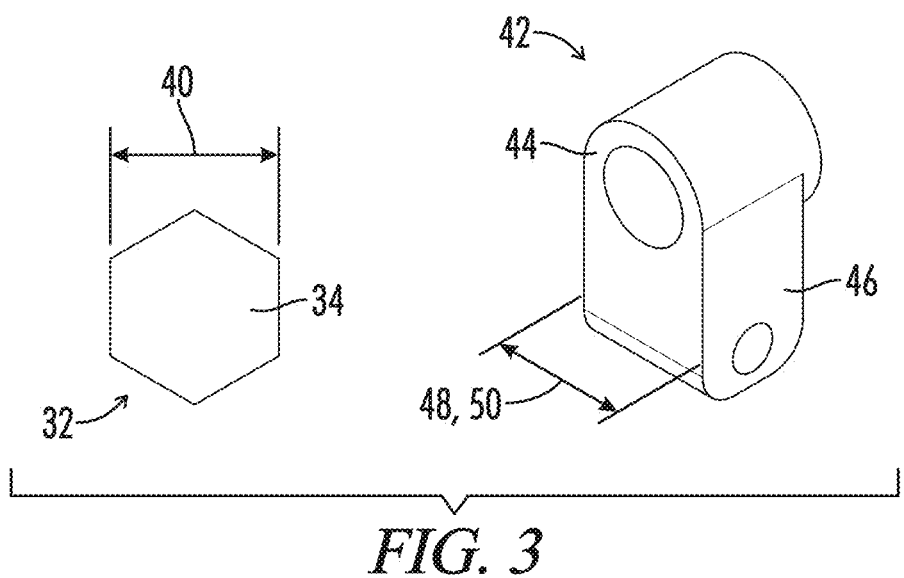
FIG. 3 is a cross-section view of the hexagonal head and adapter of FIG. 2.

The hexagonal head 34 has a size or width (the distance between two parallel sides of the hexagon) of between 0.25 and 3 inches. FIG. 3 includes a cross section view of hexagonal head 34. The cross-section view of the hexagonal head 34 is taken from a direction perpendicular to an axis of the gear shaft 32. The size or width of the hexagonal head 34 is shown as 40 in FIG. 3. The hexagonal head 34 can be easily rotated by a hex socket adapter of the same size, and the hex socket adapter can be connected to a power drill, e.g., a pneumatic screwdriver, an electric screwdriver, a pneumatic drill, an electric drill. Therefore, the trailer jack 10 can now be operated by a power drill.

Referring to FIG. 2, the trailer jack 10 includes an adapter 42 and a hand crank 20. The adapter 42 includes a bushing 44 and a rectangular block 46. The gear shaft 22 passes through the bushing 44 so that the bushing 44 surrounds the gear shaft 22. The bushing 44 can rotate freely around the gear shaft 22. The bushing 44 is located between the bevel gear 36 and the hexagonal head 34. A cross section of the bushing 44 is a ring shape, and the bushing 44 has a width (outer diameter) of 48 as shown in FIG. 3. The cross-section view of the adapter 42 is taken from a direction perpendicular to an axis of the gear shaft 22. In the cross section that is perpendicular to an axis of the gear shaft 22, the rectangular block 46 has a width 50 that is the same as the width 48 of the bushing 44. The adapter 42 is made of a hard material, preferably iron or reinforced nylon.

The hand crank 20 includes a crank 52 and a handle 54. The crank 52 is perpendicular to the handle 54. The cross section of the crank 52 from a direction perpendicular to an axis of the crank 52 has a U shape. The crank 52 includes two side walls 56 and a connecting wall 58. The crank 52 is also made of a hard material, preferably iron or reinforced nylon.

Figure 4:
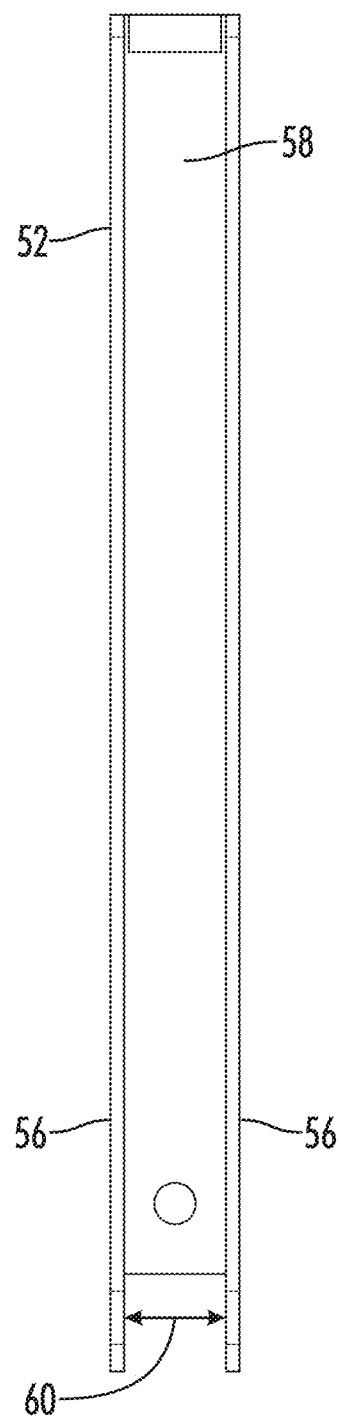
FIG. 4 is a cross-section view the crank of FIG. 2.

FIG. 4 is a section view of the crank 52 from a direction perpendicular to an axis of the handle 54. As shown in FIG. 4, a distance between the two side walls 56 is 60. The distance 60 is the same as or slightly longer (e.g., between 1 and 5 millimeters, preferably 1 and 2 millimeters) than the width 40 of the hexagonal head 34.

The trailer jack 10 also includes a bolt 62. The bolt 62 passes through the two side walls 56 and the rectangular block 46 to rotatably connect the hand crank 20 to the adapter 42.

To manually operate the trailer jack 10, a user will rotate the hand crank 20 toward the hexagonal head 34. Because the distance 60 between the two side walls 56 is the same as or slightly longer than the width 40 of the hexagonal head 34, the hexagonal head 34 tightly fits between the two side walls 56. Thus, the side walls 56 engage the hexagonal head 34 so that a rotation of the hand crank 20 causes the rotation of the driving gear 30. The driving gear 30 in turn rotates the threaded rod 24 to lift and lower the trailer jack 10.

To operate the trailer jack 10 with a power drill, a user can rotate the hand crank 20 to expose the hexagonal head 34. The user can rotate the hexagonal head 34 using a hex socket adapter of the same size connected to a power drill. Therefore, the trailer jack 10 can now be operated by a power drill.

Figure 5:
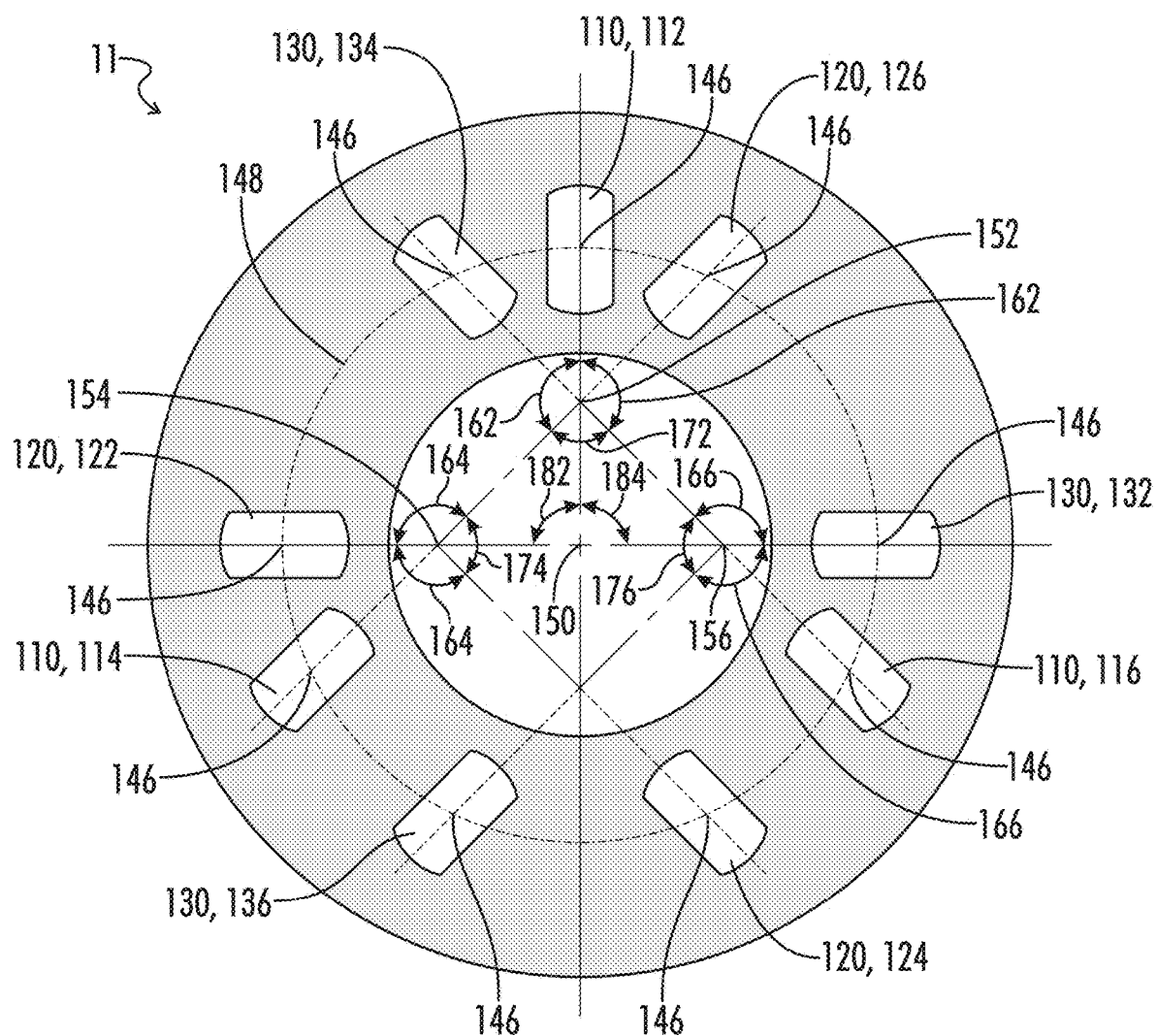
FIG. 5 is a schematic top view of the mounting flange of the trailer jack of FIG. 1. Schematically illustrated are the bolt pattern axes, the longitudinal axes of the slots, the central axis, and the bolt pattern circle.

As schematically illustrated in FIG. 5, the mounting flange 11 is preferably circular and includes three bolt patterns 110, 120, and 130. Each of the three bolt patterns include three slots. For example, the first bolt pattern 110 includes a forward slot 112 and two rear slots 114 and 116. The second bolt pattern 120 includes a forward slot 122 and two rear slots 124 and 126. The third bolt pattern 130 includes a forward slot 132 and two rear slots 134 and 136.

Figure 6:
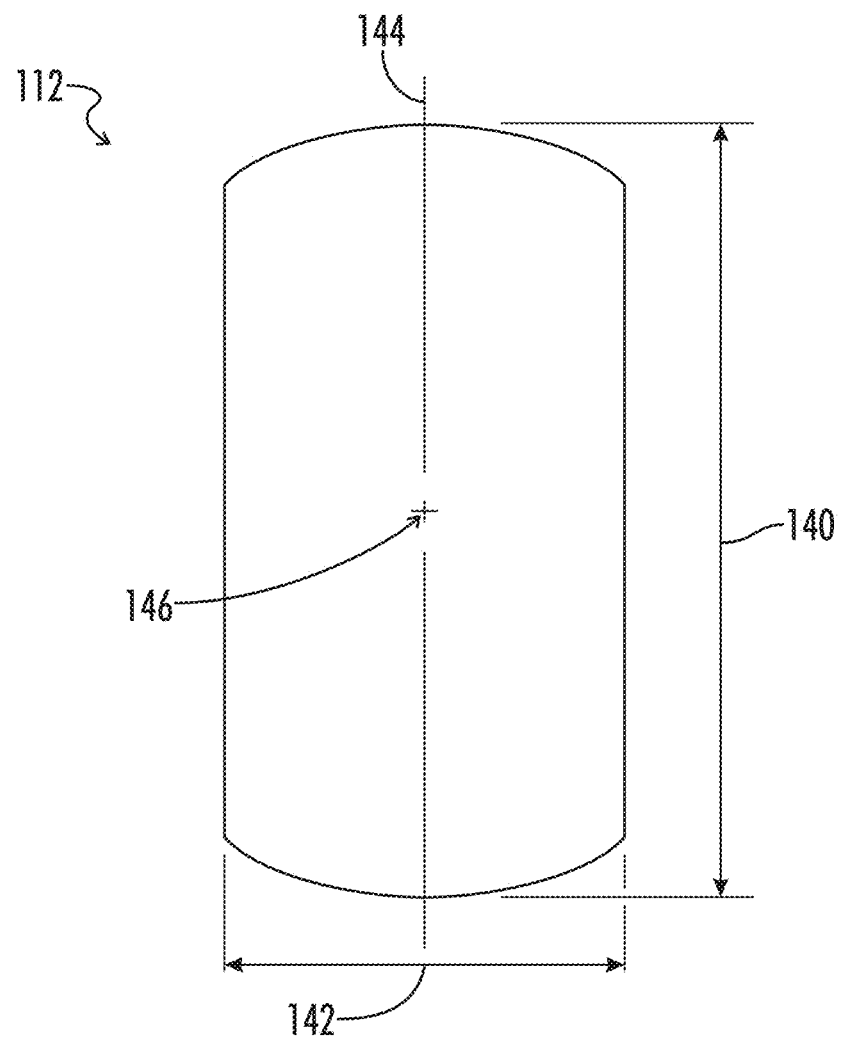
FIG. 6 is a schematic top view of a single slot of the mounting flange of FIG. 5. Schematically illustrated is the longitudinal axis.

An enlarged version of slot 112 is shown in FIG. 6. All of the slots are uniform in size. Each slot has a longitudinal length 140 of between 19 and 20 millimeters, preferably 19 millimeters, and a width 142 of between 10.5 and 10.8 millimeters, preferably 10.5 millimeters. Each slot further includes a longitudinal axis 144 and a slot center 146 located at the mid-point of each slot length 140 defined along the longitudinal axis 144 of the slot.

As schematically illustrated in FIG. 5, the slot centers 146 lie on a bolt pattern circle 148 that has a diameter of between 88 and 91 millimeters, preferably 89.5 millimeters.

The longitudinal axes 144 of the three forward slots 112, 122, and 132 intersect at a central axis 150. For any single bolt pattern, the longitudinal axes 144 of the slots intersect at a bolt pattern axis. For example, the longitudinal axes 144 of the forward slot 112 and the rear slots 114 and 116 of the first bolt pattern 110 intersect at a first bolt pattern axis 152. The longitudinal axes 144 of the forward slot 122 and the rear slots 124 and 126 of the second bolt pattern 120 intersect at a second bolt pattern axis 154. The longitudinal axes 144 of the forward slot 132 and the rear slots 134 and 136 of the third bolt pattern 130 intersect at a third bolt pattern axis 156.

Each bolt pattern axis is closer to the forward slot of the same bolt pattern than it is to the rear slots. For example, the first bolt pattern axis 152 is closer to the forward slot 112 than to the rear slots 114 and 116. The second bolt pattern axis 154 is closer to the forward slot 122 than to the rear slots 124 and 126. The third bolt pattern axis 156 is closer to the forward slot 132 than to the rear slots 134 and 136.

The central axis 150 is offset from each of the three bolt pattern axes 152, 154, and 156. Each of the three bolt pattern axes 152, 154, and 156 are offset from each other.

The rear slots of each of the bolt patterns are non-radial with regard to the central axis 150. For example, for the first bolt pattern 110, the longitudinal axes 144 of the rear slots 114 and 116 do not intersect the central axis 150. For the second bolt pattern 120, the longitudinal axes 144 of the rear slots 124 and 126 do not intersect the central axis 150. For the third bolt pattern 130, the longitudinal axes 144 of the rear slots 134 and 136 do not intersect the central axis 150.

The forward slot of each of the bolt patterns is radial with regard to the central axis 150. For example, the longitudinal axis 144 of the forward slot 112 of the first bolt pattern 110 intersects the central axis 150. The longitudinal axis 144 of the forward slot 122 of the second bolt pattern 120 intersects the central axis 150. The longitudinal axis 144 of the forward slot 132 of the third bolt pattern 130 intersects the central axis 150.

The longitudinal axis 144 of each rear slot is separated from the longitudinal axis 144 of the forward slot of the same bolt pattern by between 130 and 140 degrees, preferably 135 degrees, with regard to the bolt pattern axis. For example, for the first bolt pattern 110, the longitudinal axis 144 of each of the rear slots 114 and 116 is separated from the longitudinal axis 144 of the forward slot 112 by between 130 and 140 degrees, preferably 135 degrees, with regard to the first bolt pattern axis 152. This angle is designated number 162. For the second bolt pattern 120, the longitudinal axis 144 of each of the rear slots 124 and 126 is separated from the longitudinal axis 144 of the forward slot 122 by between 130 and 140 degrees, preferably 135 degrees, with regard to the second bolt pattern axis 154. This angle is designated number 164. For the third bolt pattern 130, the longitudinal axis 144 of each of the rear slots 134 and 136 is separated from the longitudinal axis 144 of the forward slot 132 by between 130 and 140 degrees, preferably 135 degrees, with regard to the third bolt pattern axis 156. This angle is designated number 166.

The longitudinal axes 144 of the rear slots of any single bolt pattern are separated by between 85 and 95 degrees, preferably 90 degrees, with regard to the bolt pattern axis. For example, for the first bolt pattern 110, the longitudinal axis 144 of the rear slot 114 is separated from the longitudinal axis 144 of the rear slot 116 by between 85 and 95 degrees, preferably 90 degrees. This angle is designated number 172. For the second bolt pattern 120, the longitudinal axis 144 of the rear slot 124 is separated from the longitudinal axis 144 of the rear slot 126 by between 85 and 95 degrees, preferably 90 degrees. This angle is designated number 174. For the third bolt pattern 130, the longitudinal axis 144 of the rear slot 134 is separated from the longitudinal axis 144 of the rear slot 136 by between 85 and 95 degrees, preferably 90 degrees. This angle is designated number 176.

The longitudinal axis 144 of the forward slot 112 of the first bolt pattern 110 is separated from the longitudinal axis 144 of the forward slot 122 of the second bolt pattern 120 by between 85 and 95 degrees, preferably 90 degrees. This angle is designated number 182. The longitudinal axis 144 of the forward slot 112 of the first bolt pattern 110 is separated from the longitudinal axis 144 of the forward slot 132 of the third bolt pattern 130 by between 85 and 95 degrees, preferably 90 degrees. This angle is designated number 184.

The first bolt pattern 110 can also be referred to as a forward bolt pattern and is assigned the same number 110. The second bolt pattern 120 can also be referred to as a right bolt pattern and is assigned the same number 120. The third bolt pattern 130 can also be referred to as a left bolt pattern and is assigned the same number 130. The hexagonal head 34 can also be referred to as a drive head and is assigned the same number 34.

Referring to FIG. 5, in another embodiment mounting flange 11 is circular and includes a central axis 150. The mounting flange 11 further includes nine slots defined through the mounting flange 11.

Three of the slots 112, 122, and 132 are radial with regard to the central axis 150 and can be referred to as first, second, and third radial slots, respectively.

Six of the slots 114, 116, 124, 126, 134, and 136 are non-radial with regard to the central axis 150 and can be referred to as first, second, third, fourth, fifth, and sixth non-radial slots, respectively.

The longitudinal axes 144 of the first radial slot 112, the first non-radial slot 114, and the second non-radial slot 116 intersect at the first offset axis 152. The longitudinal axes 144 of the second radial slot 122, the third non-radial slot 124, and the fourth non-radial slot 126 intersect at the second offset axis 154. The longitudinal axes 144 of the third radial slot 132, the fifth non-radial slot 134, and the sixth non-radial slot 136 intersect at the third offset axis 156. The first offset axis 152, second offset axis 154, and third offset axis 156 are each offset from the central axis 150.

The trailer jack 10 further includes a forward bolt pattern 110, a right bolt pattern 120, and a left bolt pattern 130. Each bolt pattern includes a radial slot and two non-radial slots. For example, the forward bolt pattern 110 includes the first radial slot 112, the first non-radial slot 114, and the second non-radial slot 116. The right bolt pattern 120 includes the second radial slot 122, the third non-radial slot 124, and the fourth non-radial slot 126. The left bolt pattern 130 includes the third radial slot 132, the fifth non-radial slot 134, and the sixth non-radial slot 136.

Figure 7:
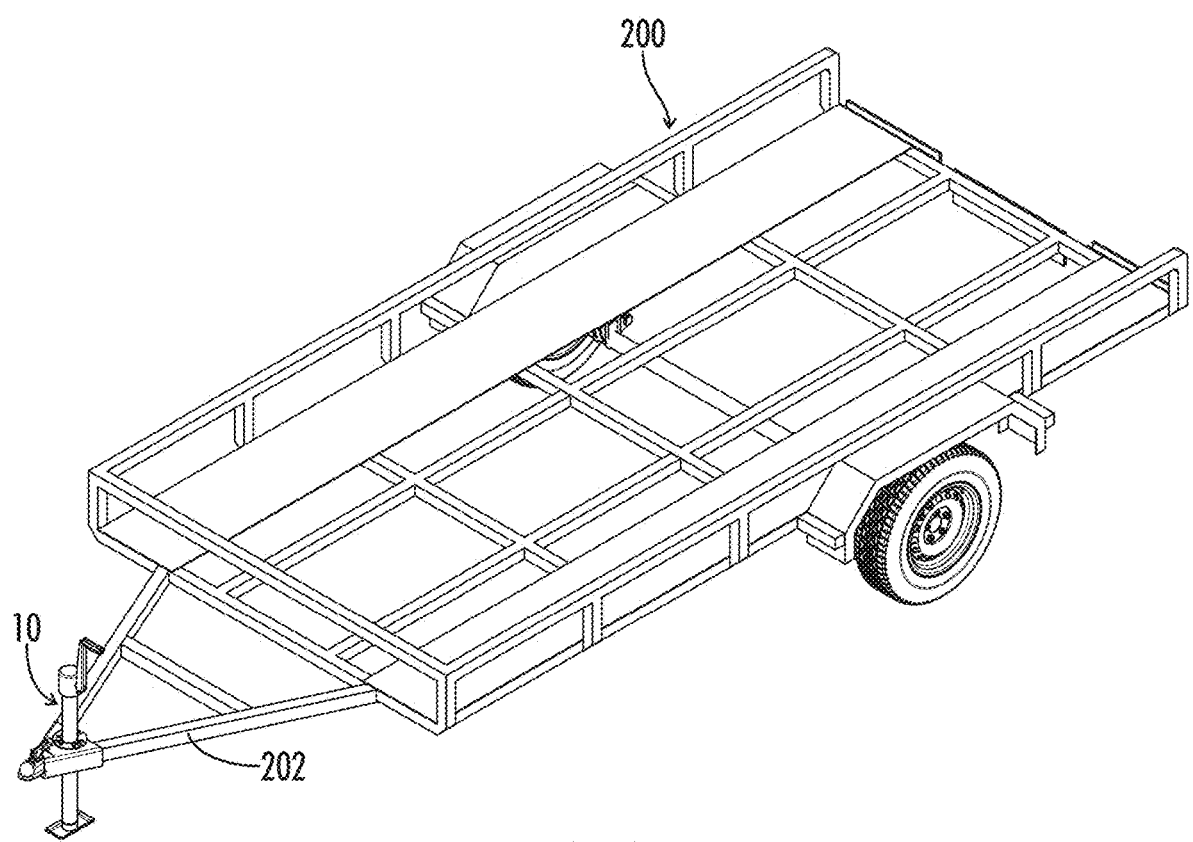
FIG. 7 is a perspective view of the trailer jack of FIG. 1 in relation to a trailer.
Figure 8:
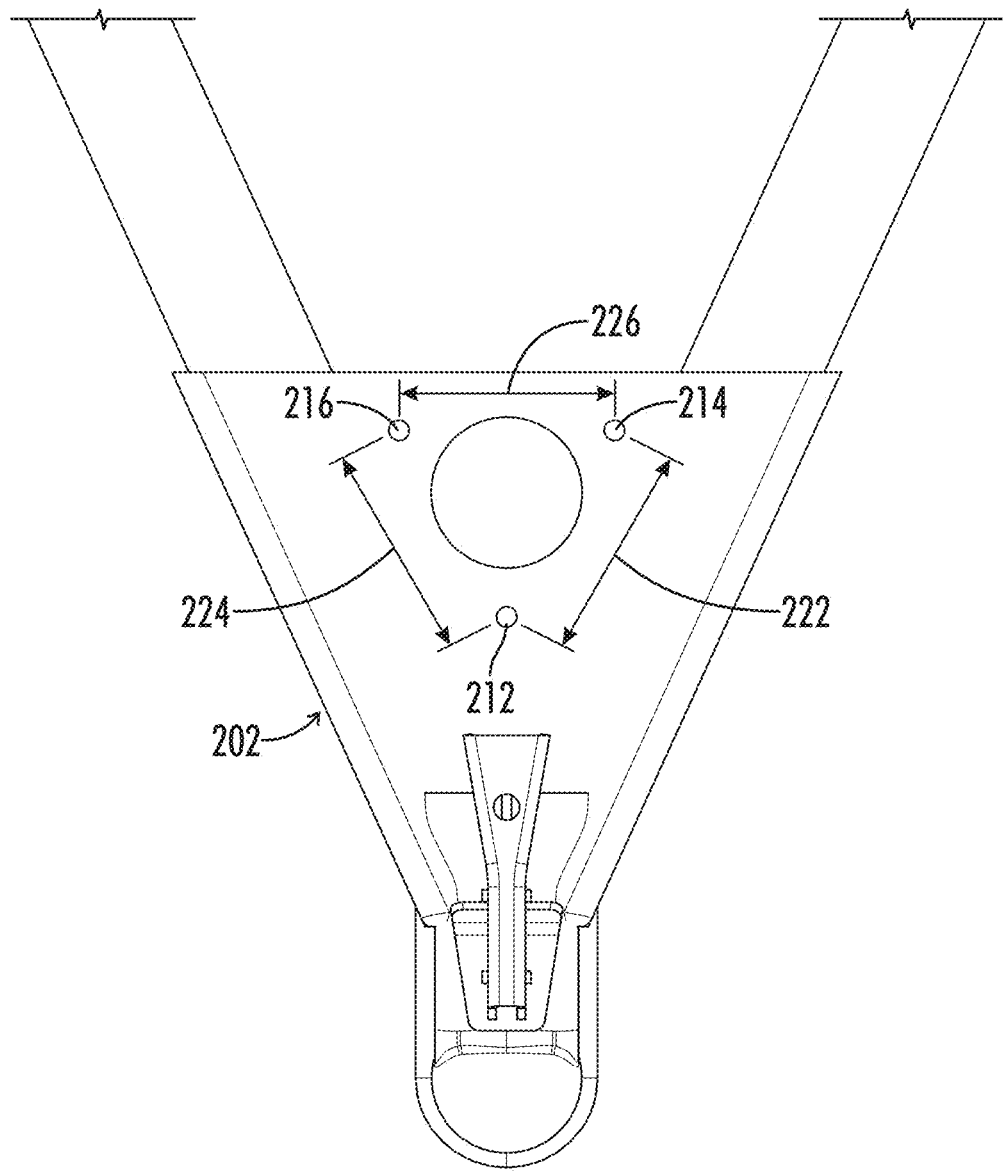
FIG. 8 is a schematic top view of a trailer tongue with a trailer attachment pattern.

FIG. 7 shows a trailer jack 10 as it is typically attached to the tongue 202 of a trailer 200. FIG. 8 schematically illustrates a trailer attachment pattern typically found on the tongue 202 of a trailer 200.

A trailer attachment pattern includes three holes 212, 214, and 216 arranged in a triangle pattern. The center of the first hole 212 is separated from the center of the second hole 214 by a length 222. The center of the first hole 212 is separated from the center of the third hole 216 by a length 224. The center of the second hole 214 is separated from the center of the third hole 216 by a length 226.

In a first trailer attachment pattern, the length 222 is 3 inches, the length 224 is 3 inches, and the length 226 is 3 inches.

In a second trailer attachment pattern, the length 222 is 3 inches, the length 224 is 3 inches, and the length 226 is 3.25 inches.

In any of the embodiments, each of the three bolt patterns are capable of alignment with the first trailer attachment pattern and the second trailer attachment pattern when the mounting flange 11 is superposed on the tongue 202 of a trailer 200.

Figure 9A:
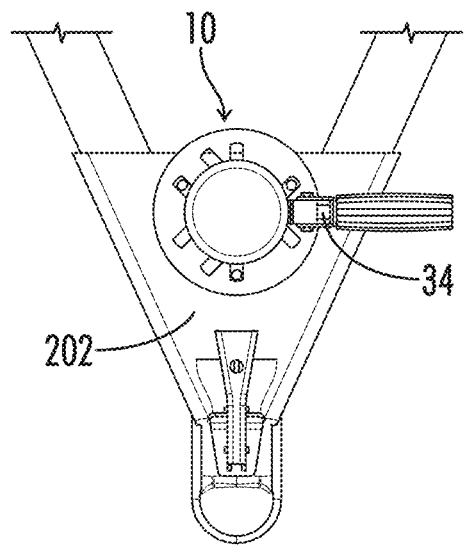
FIG. 9A is a schematic top view of the trailer jack of FIG. 1 in relation to the tongue of a trailer. The jack is shown with the left bolt pattern selected and the drive head directed to the left.
Figure 9B:
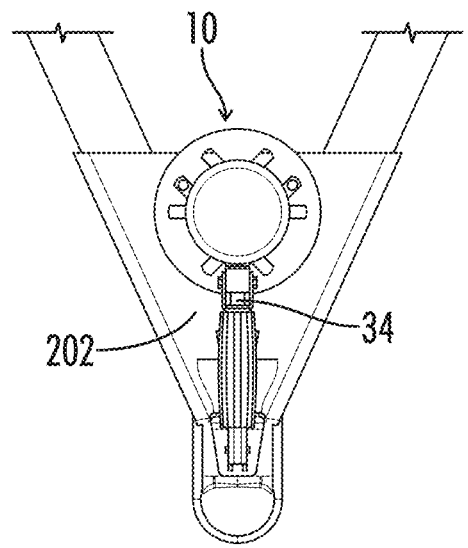
FIG. 9B is a schematic top view of the trailer jack of FIG. 1 in relation to the tongue of a trailer. The jack is shown with the forward bolt pattern selected and the drive head directed forward.
Figure 9C:
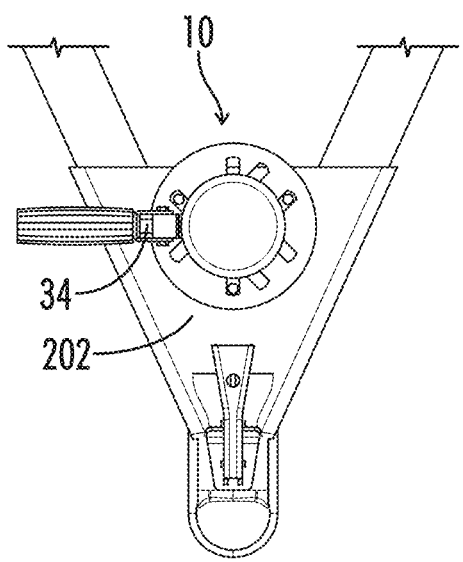
FIG. 9C is a schematic top view of the trailer jack of FIG. 1 in relation to the tongue of a trailer. The jack is shown with the right bolt pattern selected and the drive head directed to the right.

FIG. 9A, FIG. 9B, and FIG. 9C schematically illustrate the trailer jack 10 when attached to the tongue 202 of a trailer 200. As shown in FIG. 9A, the direction of the drive head 34 when the trailer jack 10 is attached to a trailer 200 is directed to the left with regard to the trailer 200 when the left bolt pattern 130 is selected. As shown in FIG. 9B, the direction of the drive head 34 when the trailer jack 10 is attached to the trailer 200 is directed forward with regard to the trailer 200 when the forward bolt pattern 110 is selected. As shown in FIG. 9C, the direction of the drive head 34 when the trailer jack 10 is attached to a trailer 200 is directed to the right with regard to the trailer 200 when the right bolt pattern 120 is selected.

What is claimed is:

1. A trailer jack comprising:
   a vertically oriented vertically extendible jack; and
   a mounting flange located on the extendible jack, the mounting flange including three bolt patterns, each of the three bolt patterns including a forward slot and two rear slots defined through the mounting flange, each slot including a longitudinal axis, the longitudinal axes of the slots of any single bolt pattern intersecting at a bolt pattern axis that is closer to the forward slot than the rear slots, the longitudinal axes of the forward slots intersecting at a central axis, the central axis being offset from each of the three bolt pattern axes, orientation of the longitudinal axis of each rear slot of the rear slots of any of the bolt patterns being non-radial with regard to the central axis, orientation of the longitudinal axis of the forward slot of any of the bolt patterns being radial with regard to the central axis.

2. The trailer jack of claim 1, wherein:
the longitudinal axis of each rear slot is separated from the longitudinal axis of the forward slot of the same bolt pattern by between 130 and 140 degrees with regard to the bolt pattern axis.

3. The trailer jack of claim 1, wherein:
the longitudinal axes of the rear slots of any single bolt pattern are separated by between 85 and 95 degrees with regard to the bolt pattern axis.

4. The trailer jack of claim 1, wherein:
each slot has a longitudinal length of between 19 and 20 millimeters and a width of between 10.5 and 10.8 millimeters.

5. The trailer jack of claim 1, wherein:
the slots are uniform in size.

6. The trailer jack of claim 1, wherein:
each of the three bolt patterns are capable of alignment with a first and second trailer attachment pattern when the mounting flange is superposed on a trailer, the first trailer attachment pattern including three holes located in a triangle pattern, the three holes including a first and second hole separated by 3 inches, the second and a third hole separated by 3 inches, and the first and third hole separated by 3 inches, the second trailer attachment pattern including three holes located in a triangle pattern, the three holes including a first and second hole separated by 3 inches, the second and a third hole separated by 3.25 inches, and the first and third hole separated by 3 inches.

7. The trailer jack of claim 1, further comprising:
a drive head located on the extendible jack; and
wherein the three bolt patterns further include a forward bolt pattern, a right bolt pattern, and a left bolt pattern, a direction of the drive head when the trailer jack is attached to a trailer is directed forward with regard to the trailer when the forward bolt pattern is selected, the direction of the drive head when the trailer jack is attached to a trailer is directed to the right with regard to the trailer when the right bolt pattern is selected, the direction of the drive head when the trailer jack is attached to a trailer is directed to the left with regard to the trailer when the left bolt pattern is selected.

8. The trailer jack of claim 7, wherein:
the longitudinal axis of the forward slot of the right bolt pattern is between 85 and 95 degrees from the longitudinal axis of the forward slot of the forward bolt pattern and the longitudinal axis of the forward slot of the forward bolt pattern is between 85 and 95 degrees from the longitudinal axis of the forward slot of the left bolt pattern.

9. The trailer jack of claim 1, wherein:
the mounting flange is circular.

10. The trailer jack of claim 1, wherein:
each slot further includes a slot center located at a mid-point of a length of each slot defined along the longitudinal axis of the slot; and
the slot centers lie on a bolt pattern circle having a diameter of between 88 and 91 millimeters.

11. A trailer jack comprising:
a vertically oriented vertically extendible jack; and
a circular mounting flange located on the extendible jack, the mounting flange including a central axis and nine slots defined through the mounting flange, the nine slots lying on a bolt pattern circle,
each slot including a longitudinal axis, orientation of longitudinal axes of three of the slots being radial with regard to the central axis, orientation of longitudinal axes of six of the slots being non-radial with regard to the central axis, the longitudinal axes of a first and second non-radial slot intersecting at a first offset axis that is offset from the central axis, the longitudinal axes of a third and fourth non-radial slot intersecting at a second offset axis that is offset from the central axis, the longitudinal axes of a fifth and sixth non-radial slot intersecting at a third offset axis that is offset from the central axis, the first, second, and third offset axes being offset from each other.

12. The trailer jack of claim 11, wherein:
the longitudinal axis of the first radial slot is separated from the longitudinal axis of the first non-radial slot by between 130 and 140 degrees with regard to the first offset axis, the longitudinal axis of the first radial slot is separated from the longitudinal axis of the second non-radial slot by between 130 and 140 degrees with regard to the first offset axis, the longitudinal axis of the second radial slot is separated from the longitudinal axis of the third non-radial slot by between 130 and 140 degrees with regard to the second offset axis, the longitudinal axis of the second radial slot is separated from the longitudinal axis of the fourth non-radial slot by between 130 and 140 degrees with regard to the second offset axis, the longitudinal axis of the third radial slot is separated from the longitudinal axis of the fifth non-radial slot by between 130 and 140 degrees with regard to the third offset axis, the longitudinal axis of the third radial slot is separated from the longitudinal axis of the sixth non-radial slot by between 130 and 140 degrees with regard to the third offset axis.

13. The trailer jack of claim 11, wherein:
the longitudinal axes of the first and second non-radial slots are separated by between 85 and 95 degrees with regard to the first offset axis, the longitudinal axes of the third and fourth non-radial slots are separated by between 85 and 95 degrees with regard to the second offset axis, and the longitudinal axes of the fifth and sixth non-radial slots are separated by between 85 and 95 degrees with regard to the third offset axis.

14. The trailer jack of claim 11, wherein:
the longitudinal axes of a first and a second radial slot are separated by between 85 and 95 degrees with regard to the central axis, the longitudinal axes of the second and a third radial slot are separated by between 85 and 95 degrees with regard to the central axis.

15. The trailer jack of claim 11, wherein:
each slot has a longitudinal length of between 19 and 20 millimeters and a width of between 10.5 and 10.8 millimeters.

16. The trailer jack of claim 11, wherein:
the slots are uniform in size.

17. The trailer jack of claim 11, further comprising:
a forward bolt pattern including the first radial slot, the first non-radial slot, and the second non-radial slot;
a right bolt pattern including the second radial slot, the third non-radial slot, and the fourth non-radial slot;
a left bolt pattern including the third radial slot, the fifth non-radial slot, and the sixth non-radial slot; and
wherein each of the three bolt patterns are capable of alignment with a first and second trailer attachment pattern when the mounting flange is superposed on a trailer, the first trailer attachment pattern including three holes located in a triangle pattern, the three holes including a first and second hole separated by 3 inches, the second and a third hole separated by 3 inches, and the first and third hole separated by 3 inches, the second trailer attachment pattern including three holes located in a triangle pattern, the three holes including a first and second hole separated by 3 inches, the second and a third hole separated by 3.25 inches, and the first and third hole separated by 3 inches.

18. The trailer jack of claim 17, further comprising:

a drive head located on the extendible jack; and wherein a direction of the drive head when the trailer jack is attached to a trailer is directed forward with regard to the trailer when the forward bolt pattern is selected, the direction of the drive head when the trailer jack is attached to a trailer is directed to the right with regard to the trailer when the right bolt pattern is selected, the direction of the drive head when the trailer jack is attached to a trailer is directed to the left with regard to the trailer when the left bolt pattern is selected.

19. The trailer jack of claim 11, wherein:

each slot further includes a slot center located at a mid-point of a length of each slot defined along the longitudinal axis of the slot; and the slot centers lie on the bolt pattern circle having a diameter of between 88 and 91 millimeters.

\* \* \* \* \*